Patented Nov. 22, 1932

1,888,849

UNITED STATES PATENT OFFICE

EDWARD S. DAWSON, JR., OF SCHENECTADY, NEW YORK, ASSIGNOR TO GENERAL ELECTRIC COMPANY, A CORPORATION OF NEW YORK

PROCESS OF MAKING RESINOUS COMPOSITIONS

No Drawing.  Application filed February 17, 1927. Serial No. 169,146.

The present invention relates to the production of compositions suitable for use for various purposes, such as a varnish base, for the production of molded articles, for coating electrical conductors and for such other uses for which resinous materials have been commonly employed and comprising in particular a homogeneous composition of a drying oil and a resin made from a polyhydric alcohol and a polybasic acid.

The present invention comprises a method of making such a resin-oil complex which does not require the use of a separate solvent, and by which the presence of free oil in the product may be avoided, namely by utilizing one of the resin ingredients, (for example phthalic anhydride) as a solvent for the oil, when carrying out the resinification reaction.

My invention is particularly applicable to the production of a composition of drying oil and a resin made from glycerine and phthalic anhydride and which constitutes one member of the general class of resins comprising a polyhydric alcohol and a polybasic acid and known by the class name of alkyd resins.

The following specific example illustrates a method of carrying out my invention in the preparation of varnish compositions for which either a raw or boiled drying oil may be used.

A resin may be prepared by dissolving a suitable amount of drying oil, as for example raw linseed oil, in phthalic anhydride from which an alkyd resin is prepared by the interaction of glycerol or other polyhydric alcohol. For example, 70 parts of linseed oil are dissolved in about 206 parts of phthalic anhydride by weight, preferably by melting the anhydride, then adding the oil and continuing heating until complete miscibility occurs. About 92 parts by weight of glycerine then are added to the solution and the mixture is heated to a temperature rising gradually to about 250° C. to cause chemical reaction between the ingredients. Water vapor and some anhydride are given off during the reaction. The resulting product is a brownish resin which may be dissolved in common organic solvents, such as benzol-alcohol (denatured), acetone, glycol diacetate or diethyl phthalate. Such a solution may be used as a varnish and may be either caused to air dry or may be set by heating to a temperature of 125–150° C. The resin also may be used as a molding material either with or without a filler of mineral material and may be converted to the infusible state by heating to about 200° C. for about one hour, under pressure, say, 1000 pounds per square inch.

Other fatty oils besides linseed oil, such as China-wood and perilla oil may be incorporated in the alkyd resin by the above method.

Resins containing a drying oil may be made by dissolving the oil in other polybasic acids, such as camphoric, naphthalic, benzoic, malonic acids and then carrying out the reaction with glycerine, glycol, or other polyhydric alcohol in accordance with the above example.

What I claim as new and desire to secure by Letters Patent of the United States, is:

1. The process of compounding a drying oil with an alkyd resin which consists in dissolving said oil in a polybasic, organic acid and reacting upon said solution with a polyhydric alcohol at a temperature sufficiently high to produce resinification.

2. The process of forming a resinous material which consists in dissolving a drying oil in a polybasic acid of the aromatic series and then esterifying the acid in the solution with a polyhydric alcohol.

3. The process of forming a resinous material which consists in dissolving a drying oil in phthalic anhydride, combining glycerine with the acid in the solution and heating until a resinous product is formed.

4. The process of forming a resinous material which consists in adding 70 parts by weight of drying oil to about 200 parts by weight of phthalic anhydride, heating to produce solution, adding about 90 parts by weight of glycerine and heating to a reaction temperature.

5. The process of forming a resinous material which consists in fusing phthalic anhydride and dissolving a drying oil in the fusion, adding sufficient glycerine to the fusion to esterify said acid and heating to a temperature of about 200° C. until a resinous product is formed which is convertible by further heating to an infusible condition.

6. The process of preparing a resinous product which consists in separately combining a drying oil with phthalic anhydride and then heating the combined mass with glycerine until a resinous product results.

In witness whereof, I have hereunto set my hand this 15th day of February 1927.

EDWARD S. DAWSON, Jr.